Aug. 4, 1959 A. AXELROD ET AL 2,898,511

SWEEP GENERATORS

Filed March 15, 1956 3 Sheets-Sheet 1

INVENTORS
ALBERT AXELROD
RALPH H. BAER

ATTORNEY

Aug. 4, 1959 A. AXELROD ET AL 2,898,511

SWEEP GENERATORS

Filed March 15, 1956 3 Sheets-Sheet 2

INVENTORS
ALBERT AXELROD
RALPH H. BAER

BY Theodore Sapne[?]

ATTORNEY

Aug. 4, 1959 A. AXELROD ET AL 2,898,511

SWEEP GENERATORS

Filed March 15, 1956

3 Sheets-Sheet 3

INVENTORS
ALBERT AXELROD
RALPH H. BAER
Theodor Wolner
ATTORNEY 2,898,511

SWEEP GENERATORS

Albert Axelrod, Bronx, and Ralph H. Baer, New York, N.Y., assignors to Transitron, Inc., a corporation of New Jersey Application March 15, 1956, Serial No. 571,746
4 Claims. (Cl. 315—23)

Improvements in or relating to sweep generators is a continuation in part of patent specification No. 276,198, filed on March 8, 1955, now Patent No. 2,765,405, by Albert Axelrod, and U.S. Serial No. 493,006, filed on March 8, 1955, now abandoned, by Albert Axelrod.

This invention relates to the generation of sweep voltages and more specifically to the provision of low-power test signals covering a wide range of radio frequencies.

One object of this invention is to provide a portable radio test set designed to provide low-power radio-frequency test signals in the frequency range of 15 to 400 megacycles per second, at a power level within the range of 0.1 microvolt to 100,000 microvolts (equivalent to a range of —7 to —127 db below one milliwatt) when terminated in a 50-ohm load.

Another object of the invention is to provide continuous-wave amplitude-modulated and frequency-modulated output signals for testing, calibrating, aligning, and setting gain adjustments of intermediate and radio frequency tuned circuits having band widths from 10 kc. to 30 mc., at center frequencies within the range of 15 to 400 mc.

Still another object of the invention is to display oscilloscopically the band-pass curve of the equipment under test, when frequency-modulated test signals are utilized.

A further object of the invention is to provide a radio frequency oscillator of continuously changing frequency under control of an electromechanical transducer which in turn is controlled by a low fixed frequency sweep generator also controlling one of the deflection circuits, preferably the horizontal deflection circuit of a cathode ray tube, the other deflection circuit of which, preferably after mixture with suitable marker signals, is controlled by the input to be tested.

Still further an object of the invention is to provide a radio frequency oscillator the input of which is controlled over a series regulator and the output of which is fed back to a feed back amplifier controlled over a cathode follower by a low fixed frequency oscillator, and simultaneously is fed back to an amplifier including means for measuring modulation, power and zero settings.

A more specific object of the invention is to provide a radio frequency sweep oscillator the frequency of which is controlled by an electrodynamic transducer which is controlled by a push pull power amplifier derived from a phase splitter, to which a part of the transducer input is fed back, and which in turn is controlled by a low fixed frequency oscillator.

Figure 1:
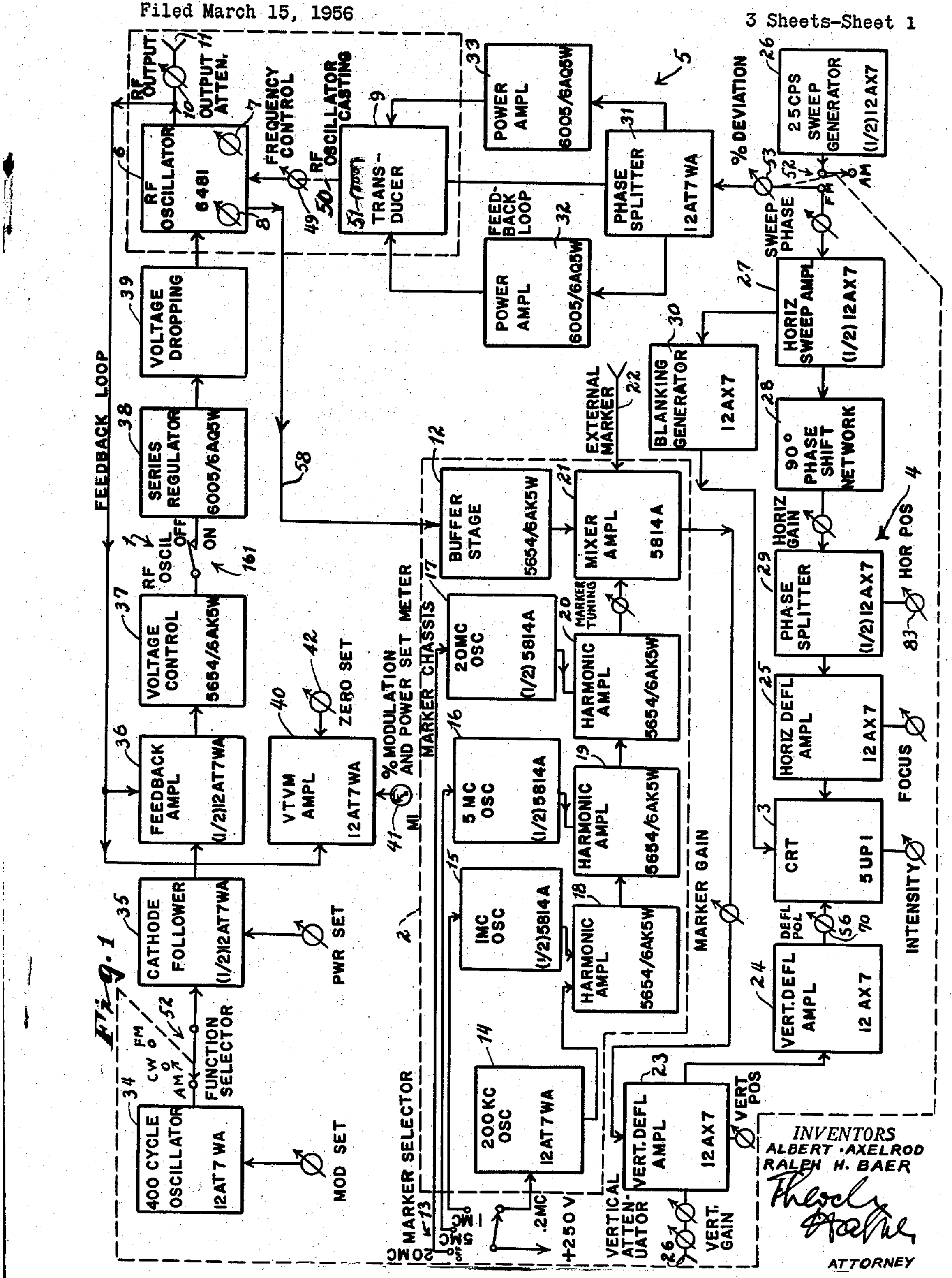

These and other objects of the invention will be more fully described in the accompanying drawings in which:

Fig. 1 represents an embodiment of the invention in the form of a block diagram.

Figure 2A:
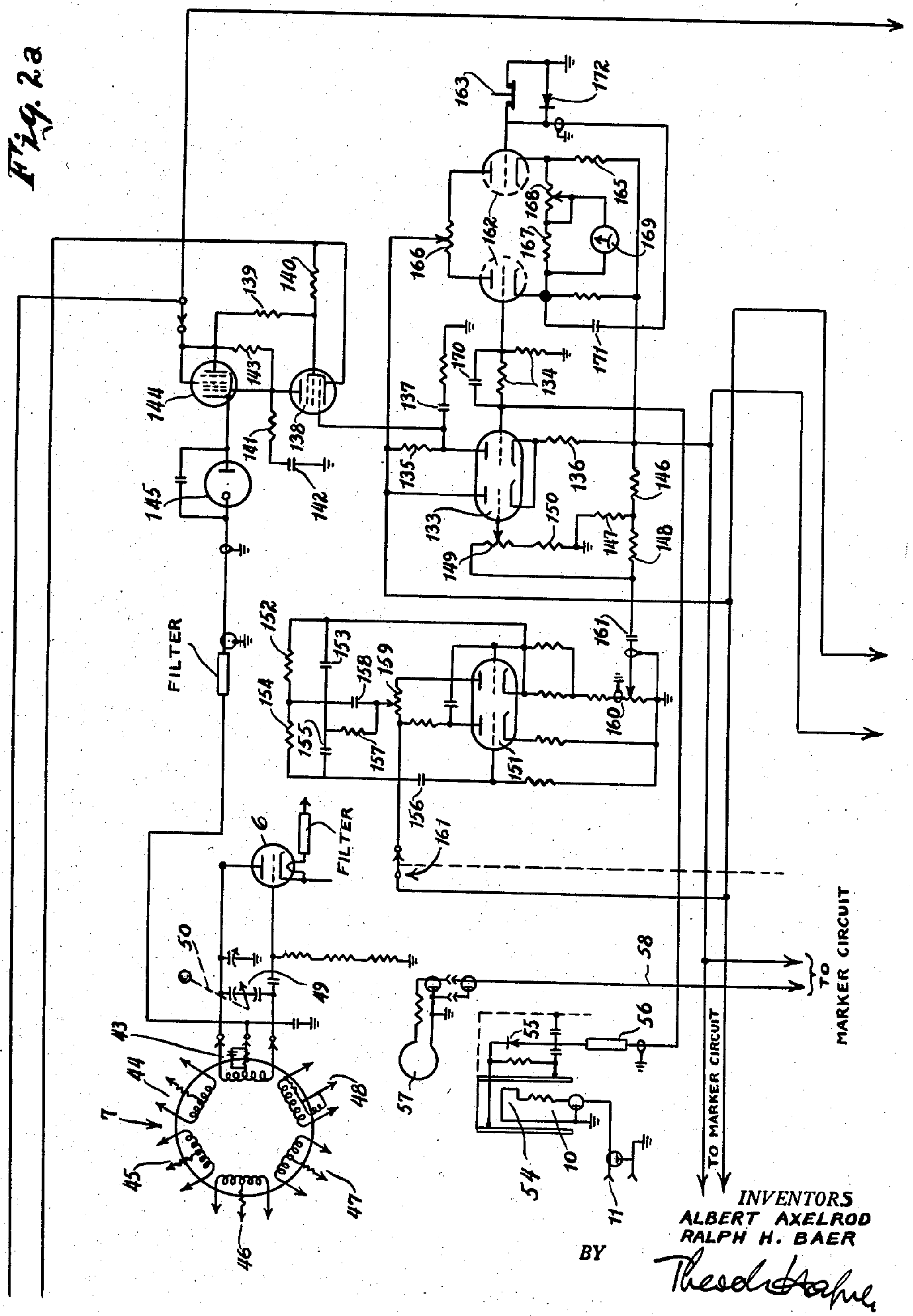
Figure 2B:
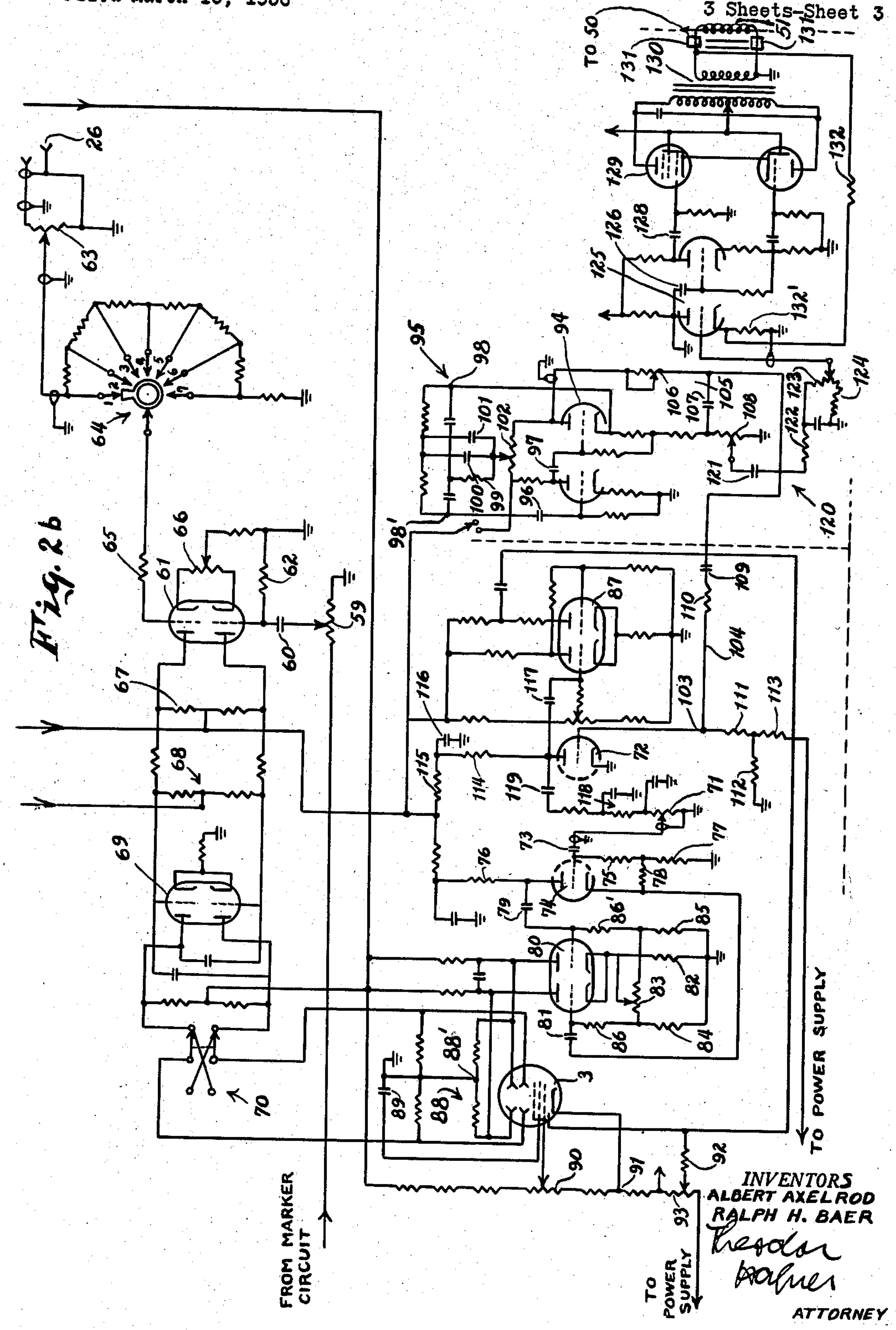

Figs. 2*a* and 2*b* mounted one above the other represent parts of this block diagram in greater detail.

A sweep generator in accordance with the invention is a signal generator which provides a frequency-modulated signal of known amplitude, percentage deviation, and frequency in the range from 15 to 400 megacycles per second. In addition, continuous-wave signals, and amplitude-modulated signals of a known percentage modulation, are obtainable.

As apparent from Fig. 1 a sweep generator consists essentially of an R-F oscillator assembly 1, marker 2, oscilloscope 3, sweep generator and modulating circuits 4, power-stabilizing and monitoring bridge circuit 5, and a self-contained power supply circuit (not shown).

The R-F oscillator assembly 1 consists of a planar-triode disc-seal oscillator tube 6 which generates the desired signal. The frequency of the signal is determined by the position of two front panel controls. One control, designated Band Selector 7, has six positions, and functions to connect one of six tuned circuits into the plate circuit of the R-F oscillator. A second control 8, designated Tuning, is continuously variable and functions to determine the amount of capacitance which shunts the R-F tuned circuit. The R-F oscillator assembly also includes the following components:

*a.* A mechanically-driven transducer 9, which determines the amount of frequency deviation of the R-F output signal;

*b.* A continuously variable output attenuator 10, which couples the R-F signal to the front panel RF Output jack 11;

*c.* A fixed pickup loop, which couples over buffer-amplifier 12 a portion of the R-F oscillator detected signal to the marker circuit 2, for producing frequency identifying marker pips.

A front panel marker selector control 13 permits selection of crystal-controlled continuous-wave R-F signals derived from oscillators 14, 15, 16 and 17, respectively, over harmonic amplifiers 18, 19 and 20, respectively, at harmonics of 0.2, 1, 5, or 20 megacycles. When the signals produced by the marker generator 14 are mixed over mixer amplifier 21 with the frequency-modulated signal obtained from the R-F oscillator, marker pips appear on the scope sweep trace line. Provision is included for mixing the R-F oscillator signal with an external signal, which may be applied to the front panel External Marker jack 22. The markers are fed to the vertical deflection amplifiers 23, 24 for display on the oscilloscope screen.

The oscilloscope circuit consists in addition to vertical deflection amplifiers 23, 24, of horizontal deflection amplifier 25, and provide deflection voltages to the cathode-ray tube 3. Signals to be displayed vertically are applied to the Vertical Input jack 26. The horizontal deflection voltage is obtained internally, from the fixed-frequency sweep generator 26 over horizontal sweep amplifier 27, 90° phase shift network 28 and phase splitter 29. Blanking signals, for blanking the return trace, are provided by the blanking generator 30.

The sweep generator 26 and modulating circuits provide the necessary signals for the horizontal deflection amplifier 25, as well as for the transducer 9, and for amplitude-modulating the R–F oscillator 6. The signal for the horizontal amplifier 25 is obtained directly from the sweep generator 26. To obtain the necessary power for driving the transducer 9, a phase splitter 31 and a push-pull power-amplifier 32, 33 are provided.

To obtain amplitude-modulation, a separate 400-cycle generator 34 supplies output power, through the power-stabilizing circuit consisting of cathode follower 35, feed back amplifier 36, voltage control tube 37, series regulator 38 and voltage drop 39, to the R-F oscillator tube 6.

This power stabilizing circuit provides a means of maintaining constant power output from the R-F oscillator by controlling the plate voltage, as the detected R-F oscillator output varies.

In addition, the same circuit provides the means for amplitude-modulating the R.-F. oscillator 6, by varying the oscillator plate voltage at a fixed audio rate. This is obtained by means of a power monitoring bridge consisting of a vacuum-tube voltmeter circuit 40, which monitors the detected R.-F. output and indicates its magnitude on a meter 41, calibrated in dbm, zero setting being accomplished by an adjusting device 42. The same metering circuit also indicates the percentage modulation when the meter circuit compares the average rectified output of the reference signal with the peak of the detected audio signal.

The R.-F. oscillator assembly is housed in an aluminum casting to prevent R.-F. leakage and the oscillator tube 6, a disc-seal planertriode type, is located to the rear of the casting.

As more clearly apparent from Fig. 2, the oscillator tuned circuit consists of one of the six inductors, 43 through 48, mounted on a card assembly, and variable capacitor 49. The card assembly is rotated by the front panel band selector control 8, which selects the proper inductance for each of the six frequency ranges, such as disclosed for example in copending application U.S. Serial No. 276,198.

The variable capacitor 49, consists of a stator and a rotor. The stator is permanently mounted to the housing, and is connected between the plate and grid of tube 6. The rotor plates are mounted to the output shaft of the transducer 9, as disclosed for example in copending application U.S. Serial No. 493,006. The degree with which the rotor plates mesh with the stator plates determines the capacitance, and therefore the frequency of the R.-F. oscillator 6. The transducer 9, located in the forward portion of the housing, consists of a permanent magnet, into which is inserted a voice coil. The voice coil is coupled, by means of a shaft, to the rotor plates of capacitor 49, as schematically indicated in Figs. 1 and 2 at 50, 51 or as shown in greater detail for example, in the above mentioned copending application.

The entire transducer 9 is movable, with its position determined by the front panel tuning control 7.

Due to mechanical coupling of the voice coil to capacitor 49, the position of the transducer 9 determines the frequency of the oscillator 6.

Referring now to Fig. 1 a three-position function selector control 52, is provided to select the type of output signal desired. The output signal may be continuous wave, amplitude-modulated by internally generated sine waves at a fixed frequency of 400 c.p.s., or frequency-modulated at a frequency of 25 c.p.s. ±10 percent. Sweep deviation from ±2 to ±20 percent of the center frequency is obtained by rotating the function selector control 52 further clockwise in its FM position. The power level of the output signal can be varied from 7 to 127 decibels below one milliwatt (0.1 to 100,000 microvolts) by rotation of output attenuator control 10, which drives a piston-type waveguide. The power reference level of one milliwatt is established by the power set knob of cathode follower 35, as indicated on the bottom scale of the combined power-monitoring and percentage-modulation meter 41. Power level readings have been found accurate to ±2 dbm, when the sweep generator 26 was working into its rated load of 50 ohms.

When utilizing amplitude-modulated test signals, i.e., a 15 to 400 mc. carrier signal amplitude modulated by say 400 c.p.s., the percentage modulation of the output signal can be varied from zero to 50 percent by rotation of the modulator set control of oscillator 34. Percentage modulation indications are obtainable, for example, by a modulation-push-to-read-button switch. The percentage of modulation applied to the carrier wave is indicated by a pointer deflection on a panel-mounted meter.

When utilizing carrier wave (c.w.) operation the 15 to 400 mc. unmodulated signals are used directly.

When utilizing frequency-modulated test signals from the sweep generator, i.e. a 15 to 400 mc. carrier signal frequency modulated at say 400 c.p.s., a horizontal sweep trace from the internal sine wave generator is applied to the cathode-ray tube. Five-position marker selector 13 permits selection of marker pips at intervals of 20, 5, 1, or 0.2 mc., on the horizontal trace. Provision is made for applying marker pips from an external signal source, if desired.

With function selector 52 rotated to its FM position, the modulating signal is applied to the voice coil through appropriate filters. The voice coil vibrates at a frequency of approximately 25 c.p.s. and with an amplitude determined by the setting of the front panel percentage deviation control 53 (Fig. 1). The motion of the voice coil 51 causes a change of capacitance of 49, in synchronism with the vibration of the voice coil 51. This action produces a change in frequency of the R.-F. oscillator.

Also included in the R.-F. oscillator housing is the continuously variable output attenuator 10. The function of the attenuator is to couple the R.-F. signal to the front panel RF output 11. The attenuator consists of a circular waveguide, operating below cutoff. In this type of waveguide, energy launched into the waveguide is attenuated exponentially over the entire length. The amount of attenuation is controlled by the position of the pick-up loop 54 within the attenuator housing. Rotating the front panel output attenuator control 11, which is calibrated in dbm and microvolts, drives a rack and pinion assembly, which changes the proximity of the attenuator pick-up loop 54 to the mouth of the waveguide. The amount of energy launched into the waveguide is monitored by a type G7B crystal diode 55. The output from the crystal is fed through filler 56' to the vacuum tube voltmeter and power stabilizing circuits.

A second pick-up loop 57 is located near the oscillator coil to receive a portion of the oscillator output. This output is fed via cable 58 to the marker chassis 2. This output signal, when mixed with harmonics of the crystal controlled oscillator or with an external signal, is used to produce frequency identifying marker pips.

Signals to be displayed vertically on the cathode ray tube 3 are obtained from two sources, one internal to the signal generator and one external to the signal generator. The internal signal is the marker obtained from 22 on the marker chassis. This signal appears across an adjustable gain controlling resistance. The setting of this control determines the amplitude of the marker signal to be coupled via condenser 60 to the control grid of the vertical deflection amplifier 61, and therefore determines the amplitude of the marker pip appearing on the cathode ray tube 3. 62 is the grid return resistor.

The second source of the signal is the front panel vertical input jack 26. External signals fed to this jack will be coupled to the vertical gain control 63. The setting of this control provides fine adjustment of signal amplitude to be coupled to the vertical attenuator control 64. This control provides coarse adjustment of the signal amplitude in 10 db steps from 0 to 60 db. The output of the vertical attenuator 64 is coupled via 65 to the grid of the vertical deflection amplifier 61.

This first vertical deflection amplifier 61, is a cathode-coupled amplifier. Common cathode resistor 66 determines the minimum bias on each half of 62. Resistor 66 varies the bias applied to each half of the tube. Since the vertical deflection system is direct coupled, this bias, in turn, determines the operating point of the final stage. In this way, the setting of 66 controls the D.-C. potential of the cathode-ray tube deflecting electrodes, and the vertical position of the trace on the display screen.

Resistors 67 serve as the plate load for 61. The A.-C. signal plus the average D.-C. voltage which appears at the plate 61, is direct coupled to the voltage divider 68. The portion of the A.-C. voltage plus the divided D.-C. voltage appearing across 68 is direct coupled to the grid of the second vertical deflection amplifier 69, which is a paraphase amplifier. This type of amplifier provides signals of equal amplitude but opposite phase on each of the plates for a signal applied to either grid, with feedback extending from the plate of one half of the tube to the grid of the other, for high-frequency signals. In this manner, the bandwidth of the second vertical amplifier is extended for high-frequency components. The output from the two plates is directly connected to deflection polarity switch 70. This switch functions to connect vertical deflection plates of vertical deflection amplifier 69 respectively, in the positive position and to the opposite plates in the negative position. In this way, the direction of display can be controlled.

Voltage for horizontal deflection appears across 71, the horizontal gain control for the horizontal sweep amplifier 72. A portion of the signal from 71 is coupled via 73 to the grid of the phase splitter 74. 75 is the grid return. 76, the plate load resistor and 77, the cathode resistor, are of equal value and have developed across them signals of equal amplitude but opposite phase. 78 provides cathode bias for 74. Signals from the plate of 74 are coupled via 79 to the grid of the horizontal deflection amplifier 80. Signals from the cathode of 74, are coupled via 81 to the grid of 80. Tube 80 functions as a horizontal deflection push-pull amplifier. 82 is the common cathode resistor. However, since the grids of 80 receive signals of equal amplitude and opposite phase from 74, no signal is developed across 82. The positive D.-C. voltage appearing across 82 is fed to 83, the horizontal position control. The setting of this control determines the dividing ratio for this voltage, in conjunction with resistors 84 and 85. The divided D.-C. voltage is fed as bias voltage for the grids of 80 via grid return resistors 86 and 86′. In this way, 83 determines the relative bias between each half of 80. Since the horizontal deflection plates 3 are direct coupled to the plates of 80, the horizontal position of the trace will be determined by the setting of 83.

The blanking generator 87 provides a negative-going square wave during the time interval of the horizontal retrace, and a positive-going square wave during the time interval when the signal is being observed. The output of tube 87 is used to blank the cathode-ray tube during the retrace time.

The signal for triggering the blanking generator 87 is a sine wave from the horizontal sweep amplifier 72.

The voltages required to operate the cathode-ray tube 3 are taken from a bleeder consisting of resistors 88, which are connected to a +450 v. to 900 v. supply. Voltage for the second anode (accelerating anode), is taken from the common junction of 88′. Since these resistors are individually connected to all four deflection plates, the voltage at the junction will be the average D.-C. voltage of the deflection plates. Condenser 89 by-passes any signal at this junction. Voltage for the first anode (focusing anode) is taken from 90, the focus control. The cathode is connected to the point 91. The grid obtains its voltage via return resistor 92 from point 93, the intensity control. Since this control is at a more negative point on the bleeder than the point at which the cathode is returned, the voltage from 88 will provide the required negative bias for 3.

With the function selector 52, in the FM position, the supply voltage is applied to tube 94 corresponding to the sweep generator 26 of Fig. 1 which provides a 25 cycle sine wave for driving the transducer, for providing the horizontal sweep voltage, and for triggering the blanking generator.

The sweep generator consists primarily of a two-stage R.-C. amplifier 94, and a feedback network 95. The input to the amplifier is fed via capacitor 96 to the grid of the first section. The signal at the plate is coupled via capacitor 97 to the grid of the second section, the output from which is obtained from the plate as well as from the cathode. The output signal at the plate of this second section will be in phase with the signal at the grid of the first section, due to the two stages of amplification. On the other hand, the signal at the cathode of the second section will be 180 degrees out of phase with the signal at the grid of the first section, due to only one stage of amplification.

The feedback network 95 employed in the oscillator is of the twin-T type. This network has the characteristic of providing a null at the frequency for which it is designed; that is, it provides zero transfer impedance at the design frequency. The input of the network at junction point 98 is fed by the output of the cathode of the second section. The output of the network at junction point 99 is fed to the input of the amplifier via capacitor 96. Thus, the network couples the out-of-phase output of the amplifier to the input, resulting in degenerative feedback at all frequencies other than the null frequency.

The common terminal of the twin-T network (the junction of resistor 99 and capacitors 100 and 101) is connected to the arm of potentiometer 102, which is the plate lead for the second section. Since the output of the plate of the second section is in-phase with the grid, this connection provides regenerative feedback at all frequencies, and causes circuit instability. The frequency at which oscillation actually occurs will be that discrete frequency at which there is no degenerative feedback; that is, the null frequency of the twin-T network. The amount of feedback can be varied by the setting of the 25 cycle regeneration control 102.

To provide frequency stability, the heater voltage for sweep generator 94 is regulated preferably by the action of a ballast tube (not shown).

In Fig. 2 the input to the horizontal sweep amplifier 72, is obtained at point 103 over line 104 from the phase shifting network 105 consisting of potentiometer 106, the sweep phase control, and capacitor 107. The phase-shift network 105 is connected across the push-pull output of the sweep generator 94, with potentiometer 106 connected to the voltage appearing at the plate of the first section of 94. Capacitor 107 is connected to the voltage appearing across cathode resistor 108. Since these voltages are 180 degrees out of phase, the voltage at the junction of 106 and 107 is adjustable in phase from zero to approximately 150 degrees, by the setting of the sweep phase control 106.

The output of the phase shifting network 105 is coupled via capacitor 109 to the voltage divider consisting of resistors 110, 111 and 112. The grid of the second section of horizontal sweep amplifier 72 obtains that portion of the voltage appearing across 111 and 112. The bias voltage for the grid is obtained from the divider consisting of 113 and 112 in a minus 95-volt supply. A portion of the voltage appearing across 112 is coupled via 111 to the grid of amplifier 72. The amplified signal appears at the plate of amplifier 72 across load resistor 114. Resistor 115 and capacitor 116 provide decoupling for the plate voltage.

The output from the horizontal sweep amplifier 94 drives two circuits. One circuit is the blanking generator 87 via capacitor 117. The other is a 90-degree phase shift network 118 via capacitor 119, with each resistor-capacitor combination providing 45 degrees of phase shift. The output of the phase shift network 118 appears across horizontal gain control 71 and is coupled to the horizontal deflection amplifier 72.

A portion of the 25-cycle sweep voltage appearing across potentiometer 108, the audio drive adjustment control, is coupled via capacitor 121 to the phase shifting circuit 120 consisting of resistor 122 and capacitor 121. The output of this phase-shifting circuit 120 is fed to the voltage divider consisting of potentiometer 123, the percent deviation control, and resistor 124 The voltage at the arm of potentiometer 123 is coupled to the grid of the phase splitter 125. The first section of 125 functions as an amplifier. The signal at the plate of this first section is coupled via capacitor 126 to the grid of the second section. The signals appearing at the plate and the cathode of the second section are of equal amplitude, but opposite phase.

The signal appearing at the plate of the second section of 125 is coupled via capacitor 128 to the grid of power amplifier 129.

Transformer 130 serves as the push-pull plate load impedance for the two tubes of 129.

The secondary winding of transformer 130 provides a source of 25-cycle voltage, at a low impedance, for driving voice coil 51 of transducer 9, and for providing overall degenerative feedback for the phase splitter 125 and power amplifier stage 129. The signal for driving the transducer 9 is taken from the output terminals of transformer 130 and is coupled via filters 131 to the voice coil 51 of the transducer 9. The signal for overall feedback is fed to the voltage divider, consisting of resistors 132 and 132'. The divided signal appearing across 132', the cathode resistor of 125, first section, is of proper phase to produce degenerative feedback for the power amplifiers 129, yielding stability of operation.

In order to provide constant power output from the R-F oscillator tube 6, a means is provided for automatically adjusting the positive supply voltage applied to the oscillator, to compensate for variations in its output. The power stabilizing circuit accomplishes this action by increasing the supply voltage applied to the R-F oscillator when the oscillator output falls; conversely, the supply voltage is decreased when the R-F oscillator output rises.

Crystal diodes 55, located in the R-F oscillator housing, detects the R-F energy induced in the monitor loop, which is located across the output attenuating waveguide 10. The polarity of the circuit is arranged to provide a negative voltage output at filter 56, which then appears at the grid of the second section of amplifier 133 and across grid return resistors 134. An increase in the R-F output signal causes this voltage to become more negative; a decrease in R-F output causes the voltage to become less negative. Assume that the R-F oscillator output is increasing. The increased negative voltage at the grid of the second section of 133, increases the bias voltage of the feedback amplifier. This increased bias potential causes the voltage at the associated plate to become more positive. Resistor 135 is the plate load. Resistor 136 is the cathode resistor, which is returned to the minus 95-volt supply. Capacitor resistor combination 137 serves as a corrective network in the feedback amplifier loop, allowing maximum gain of the circuit with freedom from oscillation.

The increased positive voltage at the plate of the second section of 133 is directly coupled to the grid of the voltage control amplifier 138, the cathode of which is returned to the plus 105-volt supply. The voltage divider, consisting of resistors 139 and 140, provides proper voltage for the screen grid. Resistor 141 and capacitor 142 serve as a corrective network in the feedback amplifier loop, allowing maximum gain of the circuit, with freedom from oscillation. The increased positive voltage at the grid causes a decrease in the bias of 138 and permits more plate current to flow through the voltage control tube. This increased plate current results in a larger voltage drop across plate load resistor 143 and causes the voltage at the plate to become less positive.

Tube 144 serves as series regulator and functions as a cathode follower. Plate and screen are connected to the plus 450-volt supply. The output voltage at the cathode is determined by the voltage appearing at the grid. Since this grid is directly coupled to the plate of voltage control amplifier 138, the voltage at the cathode of 144 becomes less positive when the voltage at the plate of 144 becomes less positive. This reduced D.-C. potential is applied through voltage dropping tube 145 which is a gaseous type regulator, through filter 56 and through the inductance of one of the tuning coils 43 through 48 to the plate of the oscillator tube 6. With reduced plate voltage, the output of the oscillator tube 6 is decreased, and the automatic voltage-regulating action is accomplished.

The action of the circuit is reversed in the event that the R-F oscillator output has decreased. Under this condition, an increase in plate voltage is applied through the voltage-stabilizing circuit, to the plate of the R-F oscillator tube, resulting in increased oscillator output signal.

In order to provide a calibrated voltage from the sweep generator to the load, a means of adjusting the output voltage to a predetermined and calibrated value is provided. The first section of the power set amplifier performs this function by causing a variation in the supply voltage applied to the R-F oscillator, through the action of the power-stabilizing circuits. As previously described, a change in the bias voltage of this first section of feedback amplifier 133 produces a change in the R-F oscillator supply voltage. This change is caused by a variation in the grid voltage of that section. However, for the purpose of power setting, the change of bias applied to that section is caused by a variation in the cathode voltage. Since both halves of tube 133 have a common cathode resistor, 136, the cathode voltage will be determined, in part, by the plate current flowing through the first section of 133. This plate current is controlled by the bias voltage applied to the grid.

The bias voltage for this grid is obtained from the minus 95-volt supply. The output from this supply is applied to the voltage divider, consisting of resistors 146 and 147. The portion of the voltage appearing across 147 is applied to an additional voltage divider, consisting of resistor 148, power setting control 149 and resistor 150. The portion of the voltage appearing at the arm of the power setting control is then applied to the grid of the first section of 133. In this way, setting of the arm of the power setting control determines the voltage applied to the plate of the oscillator, through the voltage-stabilizing circuit. The output of the R-F oscillator is therefore controlled by the setting of potentiometer 149.

With the function selector 52 in Fig. 2, in the AM position, the 250-volt output of the power supply is applied to tube 151 and the 400 cycle oscillator (34 in Fig. 1) which provides a 400 cycle sine wave for amplitude-modulating the R-F oscillator.

In Fig. 2 the 400 cycle oscillator consists primarily of a two-stage R-C amplifier 151 and a feedback network.

The output signal at the plate of the second section of amplifier 151 will be in phase with the signal at the grid of the first section, due to the two stages of amplification. On the other hand, the signal at the cathode of the second section will be 180 degrees out of phase with the signal at the grid of the first section, due to only one stage of amplification.

The feedback network employed in the oscillator 151 is of the twin-T type. This network has the characteristic of providing a null at the frequency for which it is designed; that is, it provides zero transfer impedance at the design frequency. The input of the network at the junction of resistor 152 and capacitor 153 is fed by the output of the cathode of the second section of 151. The output of the network at the junction of resistor 154 and capacitor 155 is fed to the input of the amplifier 151 via capacitor 156. Thus the network couples the out-of-phase output of the amplifier to the input resulting in degenerative feedback at all frequencies other than the null frequency.

The common terminal of the twin-T network, the junction of resistor 157 and capacitor 158, is connected to the arm of potentiometer 159 which is the plate load for the second section of 151. Since the output of the plate of the second section is in-phase with the grid, this connection provides regenerative feedback at all frequencies, and causes circuit instability. The frequency at which oscillation actually occurs will be that discrete frequency at which there is no degenerative feedback; that is, the null frequency of the twin-T network. The amount of feedback can be varied by the setting of the 400 cycle regeneration adjustment control 159.

A portion of the 400 cycle voltage appearing across potentiometer 160 which forms the modulation setting control is coupled via capacitor 161 and resistor 149 to the grid of the first section of power set amplifier 133. The sine-wave signal applied to the grid of that section will cause a variation in the bias of this tube, similar to the control exercised by the power setting control in power setting. The supply voltage for the R-F oscillator is then varied at a 400-cycle rate through the power-stabilizing circuits. Since the oscillator supply voltage controls the R-F output, the oscillator output will vary in amplitude at the 400-cycle rate. The amount of voltage obtained from the modulation setting control 160, determines the percentage of modulation.

In order to provide a calibrated voltage from the sweep generator to its load, a means of monitoring the output voltage is provided. It has been shown previously that crystal diode 55, at the output of the R-F oscillator 6, produces a negative voltage across resistors 134. These components serve as the grid resistors for the feedback amplifier 133. The voltage produced across 134 is proportional to the R-F output voltage, and is employed to indicate when the R-F output voltage is of a predetermined value.

With the radio frequency oscillator switch 161 (Figs. 1 and 2) in its off position, the 450-volt output of the power supply is removed from the plate of the oscillator 151. In this condition no output will be obtained from crystal diode 55 and no voltage will appear across that resistor of 134 which forms the grid resistor for the grid of vacuum tube volt meter amplifier 162. With the modulation read-out switch 163 in its normal closed position, the grid of the second section of tube 162 also has no voltage applied to it. With the same voltage applied to both grids, both halves of tube 162 conduct almost equally and develop approximately equal voltages across each of the cathode resistors 164 and 165. Potentiometer 166 which presents the zero setting control, permits adjustment in the plate supply voltage fed to each of the plates of tube 162. By this adjustment balancing of the circuit can be obtained. With exactly equal voltages at the cathode of tube 162 no current will flow through resistor 167 and the calibration adjustment control 168 which are connected between the two cathodes; consequently no current will flow through meter 169 and zero set balance can be obtained.

With the switch 161 in its on position, the supply voltage will be restored to the oscillator and a negative voltage will be developed at the grid of the first section of tube 162. This negative voltage causes an increase in the bias of the first section of tube 162, producing a smaller voltage across cathode resistor 164. The unequal voltages now produced at the cathodes of tube 162 will cause a current flow through resistor 167 and calibration adjustment control 168, resulting in a pointer deflection of meter 169 (41 in Fig. 1). The extent of the meter pointer deflection can be adjusted by means of calibration adjustment control 168. This control is adjusted so that the meter deflection will indicate minus 7 dbm when the sweep generator is supplying minus 7 dbm to a matched load, with the output attenuator control (10 in Fig. 1) also set at minus 7 dbm.

With the function selector 52 in the AM position, amplitude modulation will be applied to the R-F oscillator. With amplitude modulation, the voltage detected by crystal diode 55 and applied to resistors 134 will consist of an average negative D.-C. voltage (as in C.W. operation) and an A.-C. voltage, which is the detected modulation envelope. The D.-C. component is applied via one of resistors 134 to the grid of the first section of tube 162. The audio voltage is applied to the grid of the first section of tube 162 via capacitor 170. This frequency sensitive voltage divider serves to increase the sensitivity of the modulation-metering circuit. With the modulation read-out switch 163 in its closed position, power set deflection will be obtained as described previously.

With the modulation read-out switch 163 in its depressed or open-circuited position, the audio voltage appearing at the cathode of 162 is coupled via capacitor 171 to crystal diode 172 and capacitor 171 is to produce a voltage at that grid which is proportional to the peak of the audio voltage. Due to the polarity of crystal diode 172 the voltage applied to this grid will be positive. Since one voltage (the average rectified D.-C. voltage applied to the second grid) is negative and the other voltage (the peak of the audio) is positive, the deflection of the meter 169 will be proportional to the difference of these two voltages, or the sum of their magnitudes. This difference voltage is proportional to the percent modulation of the R-F carrier.

The invention is not limited to the circuits, circuit elements and circuit connections shown and described, but may be applied in any form or manner whatsoever without departing from the scope of this disclosure.

We claim:

1. In a sweep generating system for cathode ray tubes, means under control of a fixed low frequency for producing high frequency oscillations, an electromechanical transducer under control of a fixed low frequency coupled to said high frequency oscillation means for producing a predetermined frequency sweep, deflection means under control of said latter fixed low frequency for deflecting the cathode ray in one predetermined direction, and further deflection means under control of said high frequency oscillations for deflecting said cathode ray into another predetermined direction, said high frequency oscillation means including a source of fixed low frequency, a cathode follower controlled by said low frequency source and controlling a feed back amplifier, a series regulator stage controlled by said feed back amplifier and controlling a high frequency oscillator including a frequency varying circuit element; said frequency varying circuit element being controlled by said electromechanical transducer; and a feed back circuit extending from said high frequency oscillator to said feed back amplifier.

2. System according to claim 1, comprising an amplifier acting as vacuum tube volt meter, and also connected to said feed back circuit, said vacuum tube volt meter amplifier being provided with means for measuring percentage of modulation and power setting and further means for adjusting zero setting.

3. System according to claim 2, wherein said mixing means include means for adding external marker signals.

4. System according to claim 3, comprising further means for applying selectively further low frequency amplitude modulation oscillations of a high frequency carrier wave, low frequency frequency modulated oscillations of a high frequency carrier wave, and an unmodulated high frequency carrier wave to control said electromechanical transducer, said further oscillation applying means being ganged with said first oscillation applying means for substantially simultaneous operation.

References Cited in the file of this patent

UNITED STATES PATENTS

| | | |
|---|---|---|
| Re. 22,150 | Bagno et al. | Aug. 4, 1942 |
| 2,071,564 | Nicolson | Feb. 23, 1937 |
| 2,082,492 | Grumel | June 1, 1937 |
| 2,215,197 | Sherman | Sept. 17, 1940 |
| 2,285,038 | Loughlin | June 2, 1942 |
| 2,445,662 | Davie | July 20, 1948 |
| 2,493,819 | Harry | Jan. 10, 1950 |
| 2,499,995 | Heller | Mar. 17, 1950 |
| 2,581,780 | Ahier | Jan. 8, 1952 |
| 2,584,144 | Maresca | Feb. 5, 1952 |
| 2,604,608 | Moore | July 22, 1952 |